Oct. 15, 1929.   F. HIMMEL ET AL   1,732,046
STORE FRONT CONSTRUCTION
Filed Nov. 21, 1928
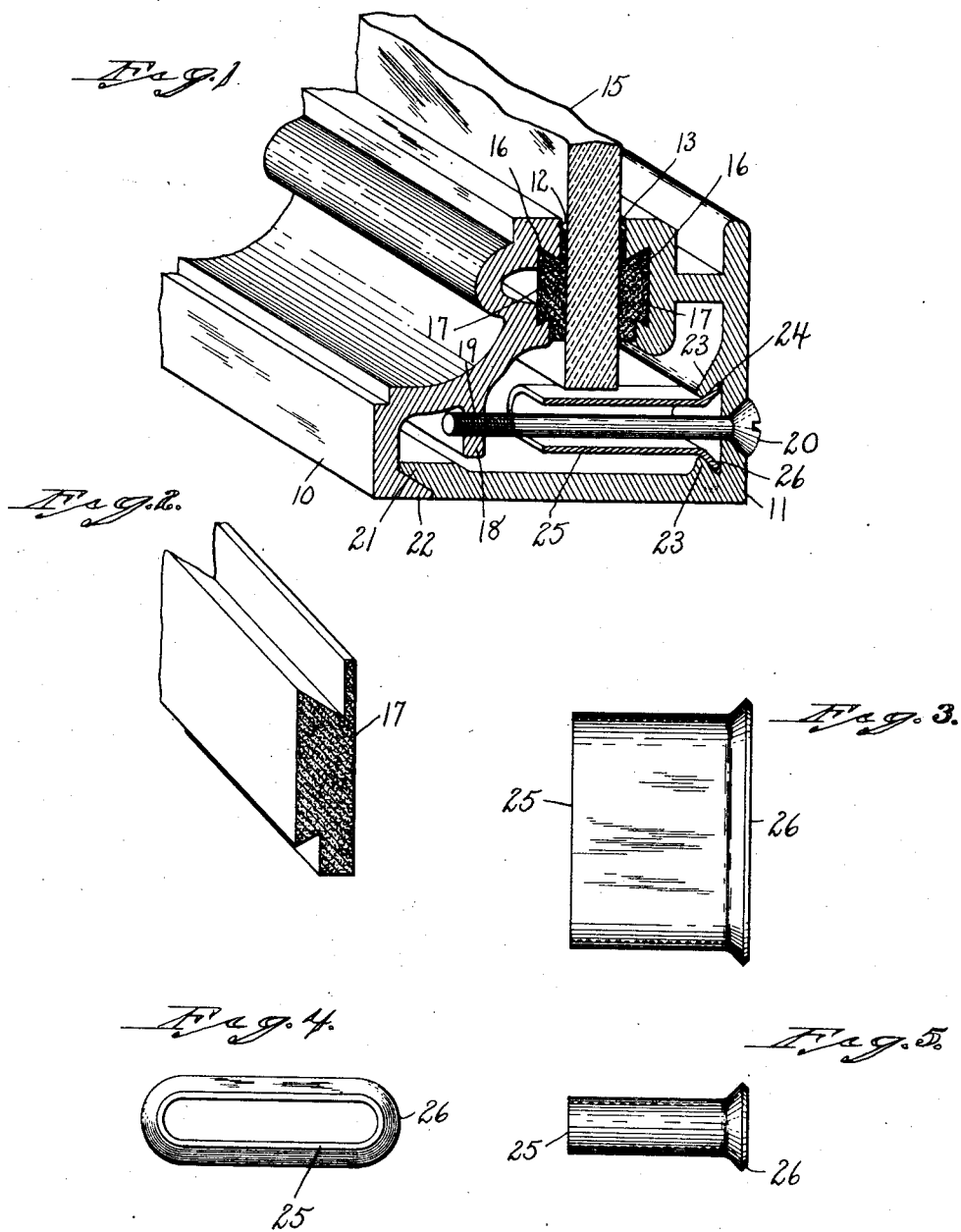

Patented Oct. 15, 1929

1,732,046

UNITED STATES PATENT OFFICE

FRED HIMMEL AND ISIDORE HIMMEL, OF NEW HAVEN, CONNECTICUT, ASSIGNORS TO THE HIMMEL BROTHERS CO., OF NEW HAVEN, CONNECTICUT, A CORPORATION

STORE-FRONT CONSTRUCTION

Application filed November 21, 1928. Serial No. 320,852.

This invention relates to an improvement in store-front construction, that is, strips of metal by which sheets of glass are held in position, and the invention particularly relates to strips of metal which are formed by extrusion as distinguished from sheet-metal strips. Extruded metal strips are necessarily so rigid that cushions between the strips and the glass are desirable, and one object of this invention is to provide the strips with means for holding cushioning material. In the use of strips for store-front construction, the bottom strips contain blocks or supports on which the edge of the glass may rest, but with the side strips it is desirable to prevent the edge of the glass coming in contact with the screws by which the inner and outer strips are connected together, and another object of the invention is to provide such strips with movable fenders through which the screws extend, and the invention consists in the construction as hereinafter described and particularly recited in the claim.

In the accompanying drawings:

Fig. 1 is a broken perspective view of a store-front construction illustrating our invention;

Fig. 2 is a perspective view of a strip of cushioning material detached;

Fig. 3 is a plan view of one of the tubular screw-protectors detached;

Fig. 4 is an end view of the same; and

Fig. 5 is a side view of the same.

In carrying out our invention we employ outer strips 10 and inner strips 11. These are formed from extruded metal of any desired design, and the adjacent faces 12 and 13 of the portions of the strip between which a sheet of glass 15 is mounted are formed with undercut longitudinal grooves 16 into which is set strips 17 of rubber, felt or other suitable material, so as to form a cushion between the adjacent faces of the metal strips and the sheet of glass. To provide means for coupling the inner and outer strips, the outer strip is formed with a longitudinal inwardly-extending rib 18, and in the construction shown in Fig. 1 of the drawings, this rib is formed with a threaded opening 19 for the reception of a screw 20 passing through the wall of the inner strip, and the outer edge of the inner strip is formed with a lip 21 beneath which the edge 22 of the outer strip extends.

The inner strip 11 is also formed on its inner face with parallel inclined ribs 23 forming between them an undercut channel 24 into which may be slipped elongated fenders 25 formed with flaring edges 26 to seat in the grooves 24, so that they may be adjusted therein wherever it is desirable to have a screw, and these fenders prevent the edge of the glass coming in contact with the screws, as shown in patent granted to us Febrary 14, 1928, No. 1,659,430, with the advantages that in the present construction these fenders are adjustable and, therefore, capable of being moved to the points where they are required and omitted for the top and bottom strips where they are not required.

We claim:

A store-front construction comprising inner and other members, the outer member formed with a depending longitudinal integral rib, the inner member formed with a longitudinal channel, a tubular fender formed with a flange adapted to enter said channel, and a screw passing through the inner member through said fender and into the said rib.

In testimony whereof, we have signed this specification.

FRED HIMMEL.
ISIDORE HIMMEL.